US012516271B2

United States Patent
Al-Bayati et al.

(10) Patent No.: US 12,516,271 B2
(45) Date of Patent: Jan. 6, 2026

(54) AUTOMATIC DISHWASHING COMPOSITION

(71) Applicant: RECKITT BENCKISER FINISH B.V., Hoofddorp (NL)

(72) Inventors: Alias Younis Al-Bayati, Heidelberg (DE); Adrian Bartholomä, Heidelberg (DE); Anna Dobosz, Heidelberg (DE); Marco Haag, Heidelberg (DE); Roger Kaiser, Heidelberg (DE); Steffen Lingler, Heidelberg (DE); Torsten Roth, Heidelberg (DE); Pavlinka Roy, Heidelberg (DE); Alexander Wink, Heidelberg (DE); Serap Yapar-Enders, Heidelberg (DE)

(73) Assignee: Reckitt Benckiser Finish B.V. (NL)

( * ) Notice: Subject to any disclaimer, the term of this patent is extended or adjusted under 35 U.S.C. 154(b) by 289 days.

(21) Appl. No.: 17/996,359

(22) PCT Filed: Apr. 8, 2021

(86) PCT No.: PCT/EP2021/059139
§ 371 (c)(1),
(2) Date: Oct. 17, 2022

(87) PCT Pub. No.: WO2021/213807
PCT Pub. Date: Oct. 28, 2021

(65) Prior Publication Data
US 2023/0042669 A1 Feb. 9, 2023

(30) Foreign Application Priority Data

Apr. 23, 2020 (GB) .................................. 2005911

(51) Int. Cl.
| | | |
|---|---|---|
| *C11D 17/04* | (2006.01) | |
| *C11D 1/72* | (2006.01) | |
| *C11D 3/00* | (2006.01) | |
| *C11D 3/20* | (2006.01) | |
| *C11D 3/37* | (2006.01) | |
| *C11D 17/00* | (2006.01) | |

(52) U.S. Cl.
CPC .......... *C11D 3/2082* (2013.01); *C11D 3/2013* (2013.01); *C11D 3/3757* (2013.01); *C11D 17/0091* (2013.01)

(58) Field of Classification Search
None
See application file for complete search history.

(56) References Cited

U.S. PATENT DOCUMENTS

| | | | |
|---|---|---|---|
| 3,769,223 A * | 10/1973 | Pearson et al. ...... | C11D 3/2096 510/357 |
| 4,654,159 A | 3/1987 | Bush et al. | |
| 2010/0275396 A1* | 11/2010 | Nakano ................. | C08F 222/02 510/357 |
| 2011/0009303 A1* | 1/2011 | Tsumori ............... | C11D 3/2086 510/223 |
| 2012/0028876 A1 | 2/2012 | Silvernail et al. | |
| 2014/0171328 A1 | 6/2014 | Armstrong et al. | |
| 2016/0068620 A1 | 3/2016 | Tamareselvy et al. | |
| 2017/0218306 A1 | 8/2017 | Martinez-Crowley et al. | |
| 2022/0145223 A1 | 5/2022 | Al-Bayati et al. | |

FOREIGN PATENT DOCUMENTS

| | | |
|---|---|---|
| CN | 107362691 A | 11/2017 |
| CN | 108165376 A | 6/2018 |
| CN | 108531297 A | 9/2018 |
| CN | 109354219 A | 2/2019 |
| EP | 3623456 A1 | 3/2003 |
| EP | 3075832 A1 | 10/2016 |
| WO | 2012/104612 A1 | 8/2012 |
| WO | 2012/140442 A1 | 10/2012 |
| WO | 2020182656 A2 | 9/2020 |

OTHER PUBLICATIONS

CN 101600763-A with English Translation (Year: 2009).*
CN 108002555-A with English Translation (Year: 2018).*
CN 110818097-A with English Translation (Year: 2020).*
International Search Report and Written Opinion for PCT Application No. PCT/EP2021/059139 mailed Jul. 20, 2021.
"Dishwashing Powder," Mintel, Apr. 6, 2020, Database accession No. 7526957.
Combined Search Report and Examination Report for GB Application No. 2005911.9 mailed Sep. 10, 2020.
China National Intellectual Property Administration; Decision of Rejection dated Dec. 17, 2024, in CN App No. 202180030410.9, filed Oct. 21, 2022.
Liu, Yun; "Principle—Raw Materials—Process—Formulation of Detergents" Chemical Industry Press (1998) p. 9.
Liu, Kairuo; "Practical Chemistry" Shanxi Normal University Press (1998), p. 19.
Written Opinion of the International Preliminary Examining Authority dated Mar. 31, 2022, in International App No. PCT/EP2021/059139, filed Apr. 8, 2021.
English Translation of First Office Action dated Feb. 24, 2024, in Chinese App No. CN 202180030410.9, filed Apr. 23, 2020.
"Technical Data Sheet: Acusol(TM) 588 Polymer," (2019), pp. 1-4, XP055904201, Retrieved from Internet.

* cited by examiner

*Primary Examiner* — Lorna M Douyon
(74) *Attorney, Agent, or Firm* — Lerner David LLP

(57) ABSTRACT

An automatic dishwashing composition comprising polyepoxysuccinic acid (PESA) or derivatives thereof.

12 Claims, 1 Drawing Sheet

AUTOMATIC DISHWASHING COMPOSITION

CROSS-REFERENCE TO RELATED APPLICATIONS

This application is a U.S. National Phase of International Patent Application No. PCT/EP2021/059139, filed on 8 Apr. 2021, which claims priority to United Kingdom Application No. 2005911.9 filed 23 Apr. 2020. The entire contents of these applications are incorporated herein by reference in their entirety.

BACKGROUND

The present disclosure relates to automatic dishwashing compositions, and the method of manufacture and the use of the same.

There is an imperative for all consumable products (such as detergents) to be sustainable and this is occurring in tandem with an increasing commitment of consumers towards a more sustainable lifestyle and a preference to use new eco-friendly, multifunctional products in order to reduce their personal carbon dioxide footprint. This trend is not only impacting detergent producers and their supply chain, but also appliances manufacturers who have to adapt to regulations aiming to reduce water and energy consumption.

Citric acid and citrate salts (typically trisodium citrate) are known as builders in automatic dishwashing (ADW) detergents. Due to its manufacturing process via microbial fermentation, citrate is often considered a more sustainable builder compared to petrochemical-based aminocarboxylates (such as L-glutamic acid N,N-diacetic acid (GLDA) and methyl glycine N,N-diacetic acid (MGDA)). Further to this, citrate is a considerably less expensive material when compared to conventional aminocarboxylates.

However, the performance of such compositions does not match those of MGDA-based formulae (or indeed the previous generation of phosphorous-based formulae) and were therefore used primarily in areas with soft water. There is therefore the general need to develop a formulation based on a citrate builder system that achieves a similar performance in relevant ADW performance tests than conventional MGDA-based formulas.

In general, builder materials are a key component of ADW detergent formulations and provide a variety of functions during a wash cycle, for example: alkalinity and pH buffering of the wash liquor, ionic strength, removal of alkaline earth metal ions (water hardness), removal of transition metal ions from washing solutions (e.g. Ni, Cu, Cr, Co, Mn or Fe ions may generate radicals from $H_2O_2$), extraction of metal ions from soils, extraction of scale and support of re-dissolution, prevention of soil redeposition, improvement of surfactant performance ($Ca^{2+}$ and $Mg^+$ ions may reduce the efficiency of (anionic) surfactants), and the extraction of calcium ions from cell walls of microorganisms, weakening their outer surface and rendering them more vulnerable towards biocidals and preservatives (boosting effect).

Considering an exchange of an aminocarboxylate chelating ligand with a hydroxycarboxylate while preparing an ADW formulation is challenging due to several reasons:
- certain ingredients (e.g. bleaching species, polymers or enzymes) are optimized for distinct working conditions (pH, salt concentration/ionic strength, water hardness, etc.);
- the log $K_{citrate}(Ca^{2+})$ is distinctly lower than log $K_{MGDA}(Ca^{2+})$ (3.2 vs. 7.0) and so there is a less favourable interaction of calcium ions with citrate compared to MGDA resulting in a higher remaining concentration of $Ca^{2+}$ in the wash liquor (and thus citrate being considered a 'weaker' builder); and
- stronger chelating agents are frequently identified as beneficial to the soil removal process.

The weaker chelating ability of citrate, when compared to aminocarboxylates, therefore requires an improvement in co-builder system to achieve the required level of performance.

Co-builders are usually polymers and co-polymers containing in their structure polar groups, which can bind calcium and magnesium ions present in washing liquor. Most commonly they are polycarboxylic acid salts, such as polymaleates, polyacrylates and co-polymers of the two. Notable is also usage of sulfonated monomers in their structure, such as AMPS (2-acrylamido-2-methyl-1-propanesulfonic acid).

The use of co-builders as a chelating agent is one of two functions. Due to their polymeric structure, they also exhibit unique characteristics aiding the cleaning process of detergent compositions. Without wishing to be bound by theory, it is believed that the use of large polymer molecules results in:
- limescale crystals growth inhibition, where the surface of the growing crystal is blocked and so calcium and magnesium carbonate cannot incorporate freely into the structure of growing crystals limiting their size; and
- the lifting and dispersion of soils, where polymers rich in carboxylate and other negatively charged groups electrostatically repulse and prevent aggregation of soil particles.

The main builder can also take part in the growth crystal inhibition and soil dispersion functions and so serves to limit its capability of performing the primary function of removing calcium and magnesium from the washing liquor and soil structure. A good co-builder system therefore frees up the main builder and so enhances the performance.

For the environmental reasons as discussed above, there is also a need for new biodegradable polymer(s) with a high technical performance in ADW and for such polymers to have a particularly high level of performance in citrate-based systems, especially in terms of shine performance.

The above technical problems are addressed by the present invention, which provides a composition that demonstrates comparable or even superior performance in shine and cleaning performance tests compared to standard aminocarboxylate (e.g. MGDA) based formulations, and superior cleaning and shine performances compared to citrate-based formulations.

BRIEF SUMMARY OF THE INVENTION

In one aspect, the invention provides an automatic dishwashing composition comprising: polyepoxysuccinic acid (PESA) or derivatives thereof; one or more acrylic acid-sulphonic acid copolymers; and citric acid and/or a salt thereof.

In another aspect, the invention provides a method of using a composition as described herein in an automatic dishwasher. Preferably, the composition is used to inhibit soil redistribution.

BRIEF DESCRIPTION OF THE FIGURE

The Figure shows qualitatively the comparative visual result after 5 wash cycles employing the 'Comparative Composition 5' (left, cutlery items 1-3) and the 'Inventive Composition 6' (right, cutlery items 4-6).

DETAILED DESCRIPTION OF THE INVENTION

In a first aspect of the invention there is provided an automatic dishwashing composition comprising polyepoxysuccinic acid (PESA) or derivatives thereof.

Polyepoxysuccinic acid is also known as epoxysuccinic acid homopolymer, polyoxirane-2,3-dicarboxylic acid, 2,3-oxiranedicarboxylic acid homopolymer, or poly(1-oxacyclopropane-2,3-dicarboxylic acid); and has the general structure:

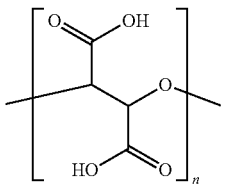

and where the derivatives thereof have the general structure:

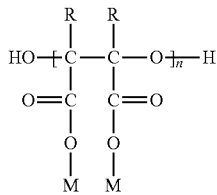

where R may be hydrogen or any organic chain (but preferably an ester such as $C_{1-4}$ alkyl) and where M may be any cation (preferably such as $Na^+$, $H^+$, $K^+$, and/or $NH_4^+$)

All references to PESA hereafter are to be taken to refer to polyepoxysuccinic acid or derivatives thereof, unless otherwise stated.

Advantageously, the PESA has a molecular weight ($M_w$) of from 100 to 10,000 g mol$^{-1}$, preferably from 400 to 2000 g mol$^{-1}$, such as from 400 to 1500 g mol$^{-1}$, or even from 400 to 900 g mol$^{-1}$. The PESA may have from 2 to 100 repeating monomer units, such as from 2 to 50, 2 to 45, 2 to 20 or even 2 to 10.

Advantageously, the composition comprises PESA in an amount of from 0.1 to 20% by weight, such as from 0.1 to 15%, from 10 to 17%, from 11 to 16%, from 0.15 to 3%, from 0.2 to 1.9%, from 0.25 to 1.5%, or even 0.6 to 1.1%. PESA is preferably present in an amount of from 5 to 100% by weight, such as from 85 to 99%, from 8 to 19%, or from 9 to 15%, relative to the total quantity of polymers present.

In an embodiment, the composition comprises PESA and one or more acrylic acid monomer-containing polymers and/or copolymers. The polymers may be present as the corresponding salts thereof.

Preferably, the composition comprises PESA, acrylic acid-sulphonic acid copolymer and/or acrylic acid-maleic acid copolymer. The inventors have surprisingly found that a polymer system comprising the combination of PESA, acrylic acid-sulphonic acid copolymer and acrylic acid-maleic acid copolymer demonstrates a synergistic effect beyond that of the individual components.

The acrylic acid-sulphonic acid copolymer preferably comprises monomers containing sulphonic acid groups are those of the formula:

$$R^1(R^2)C=C(R^3)-X-SO_3H$$

in which $R^1$ to $R^3$ mutually independently denote —$CH_3$, a straight-chain or branched saturated alkyl residue with 2 to 12 carbon atoms, a straight-chain or branched, mono- or polyunsaturated alkenyl residue with 2 to 12 carbon atoms, alkyl or alkenyl residues substituted with —$NH_2$, —OH or —COOH, or denote —COOH or —COOR$^4$, $R^4$ being a saturated or unsaturated, straight-chain or branched hydrocarbon residue with 1 to 12 carbon atoms, and X denotes an optionally present spacer group which is selected from —$(CH_2)_n$— with n=0 to 4, —COO—$(CH_2)_k$— with k=1 to 6, —C(O)—NH—C(CH$_3$)$_2$— and CH(CH$_2$CH$_3$)—. Preferred among these monomers are those of the formulae:

$$H_2C=CH-X-SO_3H$$

$$H_2C=C(CH_3)-X-SO_3H$$

$$HO_3S-X-(R^5)C=C(R^6)-X-SO_3H$$

in which $R^5$ and $R^6$ are mutually independently selected from —H, —$CH_3$, —$CH_2CH_3$, —$CH_2CH_2CH_3$, —CH(CH$_3$)$_2$ and X denotes an optionally present spacer group which is selected from —$(CH_2)_n$— with n=0 to 4, —COO—$(CH_2)_k$— with k=1 to 6, —C(O)—NH—C(CH$_3$)$_2$— and —C(O)—NH—CH(CH$_2$CH$_3$)—.

Preferred monomers containing sulphonic acid groups are here 1-acrylamido-1-propanesulphonic acid, 2-acrylamido-2-propanesulphonic acid, 2-acrylamido-2-methyl-1-propanesulphonic acid, 2-methacrylamido-2-methyl-1-propanesulphonic acid, 3-methacrylamido-2-hydroxypropanesulphonic acid, allylsulphonic acid, methallylsulphonic acid, allyloxybenzenesulphonic acid, methallyloxybenzenesulphonic acid, 2-hydroxy-3-(2-propenyloxy)propanesulphonic acid, 2-methyl-2-propene-1-sulphonic acid, styrenesulphonic acid, vinylsulphonic acid, 3-sulphopropyl acrylate, 3-sulfopropyl methacrylate, sulphomethacrylamide, sulphomethylmethacrylamide and mixtures of the stated acids or the water-soluble salts thereof. Particularly preferred is 2-acrylamido-2-methyl-1-propanesulphonic acid.

The sulphonic acid groups may be present in the polymers entirely or in part in neutralized form, i.e. the acidic hydrogen atom of the sulphonic acid group may be replaced in some or all of the sulphonic acid groups with metal ions, preferably alkali metal ions and in particular with sodium ions. It is preferred according to the invention to use copolymers containing partially or completely neutralized sulphonic acid groups.

The molar mass of the sulphonic acid copolymers preferably used according to the invention may be varied in order to tailor the properties of the polymers to the desired intended application. Preferred machine dishwashing detergents are characterized in that the copolymers have molar masses of 2000 to 200,000 g mol$^{-1}$, preferably of 4000 to 25,000 g mol$^{-1}$ and in particular of 5000 to 15,000 g mol$^{-1}$.

The acrylic acid-sulphonic acid copolymer preferably has a pH of from 3 to 5, such as from 3.5 to 4.5.

The acrylic acid-sulphonic acid copolymer is preferably present in an amount of from 1 to 10% by weight, such as from 1.5 to 9%, from 2 to 8%, from 2.5 to 7%, or from 3 to 6%.

The acrylic acid-maleic acid copolymer may be formed from 2-propenoic acid and 2,5-furandione, and preferably has a pH or from 7 to 9, such as from 7.5 to 8.5, assessed by DIN19268.

The acrylic acid-maleic acid copolymer may have a viscosity of from 500 to 3000 mPa·s, such as from 750 to 2500 mPa·s, preferably from 1000 mPa·s to 2000 mPa·s. Such a copolymer may have a molecular weight ($M_w$) of from 10,000 to 100,000 g mol$^{-1}$, such as from 20,000 to 80,000 g mol$^{-1}$, from 30,000 to 70,000 g mol$^{-1}$, and preferably from 45,000 to 55,000 g mol$^{-1}$.

The acrylic acid-maleic acid copolymer is preferably present in an amount of from 0.1 to 5% by weight, such as from 0.15 to 4%, from 0.2% to 3%, from 0.3 to 2%, or from 0.5 to 1.5%.

Silver/copper corrosion inhibitors may be present. Silver/copper corrosion inhibitors are often benzotriazole (BTA) or bis-benzotriazole and substituted derivatives thereof. Other suitable inhibitors are organic and/or inorganic redox-active substances and paraffin oil. Benzotriazole derivatives are those compounds in which the available substitution sites on the aromatic ring are partially or completely substituted. Suitable substituents are linear or branch-chain C1-20 alkyl groups and hydroxyl, thio, phenyl or halogen such as fluorine, chlorine, bromine and iodine. A preferred substituted benzotriazole is tolyltriazole (TTA). Alternatively, silver/copper corrosion inhibitors may comprise manganese salts or manganese complex compounds.

Alternatively, it has surprisingly been found that automatic dishwashing detergent compositions that do not contain one or more acrylic acid-sulphonic acid copolymers as defined herein demonstrate both good cleaning performance and an improvement when inhibiting silver corrosion.

The phenomenon of silver tarnishing increased in automatic dishwashers with the introduction of low-alkaline formulations containing oxygen bleaching agents. As a consequence, the oxidation potentials favour the formation of black silver oxide during the cleaning process. To suppress this reaction, the concentration of the bleach system had to be optimized, and silver/copper corrosion inhibitors such as benzotriazole, discussed above, had to be added. However, the biodegradability profile of these silver/copper corrosion inhibitors and derivatives mean that it desirable for silver protection to be achieved without their use.

Without wishing to be bound by theory, it appears that polymer systems containing one or more acrylic acid-sulphonic acid copolymers have been negatively contributing to corrosion of silver-containing wares.

There is thus also preferably provided an alternative embodiment where the composition does not contain one or more acrylic acid-sulphonic acid copolymers Advantageously, the composition comprises citric acid and/or a salt thereof. In the present invention the use of citrate as the primary builder of a detergent formulation has certain distinct advantages versus aminocarboxylates, such as MGDA and GLDA. For instance, citric acid has pKa values of 3.1, 4.8 and 6.4 for the three respective deprotonation steps, whereas the corresponding values for MGDA are 1.6, 2.5 and 10.5. This results in MGDA reaching its trianionic state only at a significantly higher pH value compared to citrate. Consequently, as indicated by their conditional complex stability constants, MGDA-calcium complexes are most stable in the region of pH 10-12 while the stability of citrate-calcium complexes is less pH dependent in the alkaline region. Due to the decreased log K value of citrate vs MGDA, citrate-based formulations are considered less corrosive in material care tests (e.g. resulting in less glass and decor corrosion).

Preferably, and in contrast to compositions known in the art, the composition does not comprise methyl glycine diacetic acid.

Current industrial synthetic routes toward MGDA result in a colourless material that displays a distinct deterioration of its aesthetic profile during storage (elevated temperature, high humidity, presence of oxidizing agents). In particular, MGDA-containing formulations often display a yellow discoloration and a distinct ammonia smell after storage and often contain further additives or ingredients to mitigate the detrimental effects of MGDA degradation. Strong aminocarboxylate chelating ligands may also decrease the in-wash stability of other metal-containing formula ingredients. For example, MGDA is capable of extraction the central metal ion(s) from manganese complexes commonly used in ADW formulations. The absence of MGDA thus has certain beneficial effects in the present invention.

The composition may include one or more surfactants. Any of non-ionic, anionic, cationic, amphoteric or zwitterionic surface active agents or suitable mixtures thereof may plausibly be used. Many such suitable surfactants are described in Kirk Othmer's Encyclopedia of Chemical Technology, 3rd Ed., Vol. 22, pp. 360-379, "Surfactants and Detersive Systems", incorporated by reference herein. In general, bleach-stable surfactants are preferred according to the present invention.

In the case of automatic dishwashing compositions, it is preferred to minimise the amount of anionic surfactant. Accordingly, preferably the composition comprises no more than 2 wt %, no more than 1 wt %, or no, anionic surfactant. Preferably the composition comprises no more than 5 wt %, no more than 1 wt %, or no, ionic surfactant of any type.

Non-ionic surfactants are especially preferred instead for automatic dishwashing products, preferably comprising from 3 to 25% by weight, such as from 4 to 8%, from 4.5 to 7% (e.g. when the product is in the form of a tablet), from 10 to 20%, from 11 to 19%, from 12 to 18%, or from 13 to 17% (e.g. when the product is in the form of a multi-chamber water-soluble pouch), of one or more nonionic surfactants.

Preferably, the non-ionic surfactant is an optionally end capped alkyl alkoxylate. A preferred class of nonionic surfactants is ethoxylated non-ionic surfactants prepared by the reaction of a monohydroxy alkanol or alkyl phenol with 6 to 20 carbon atoms. Preferably the surfactants have at least 12 moles per mole of alcohol or alkyl phenol. Particularly preferred non-ionic surfactants are the non-ionics from a linear chain fatty alcohol with 10-20 carbon atoms and at least 5 moles, such as from 20 to 30 moles, of ethylene oxide per mole of alcohol. According to one embodiment of the invention, the non-ionic surfactants additionally may comprise propylene oxide units in the molecule. Preferably these PO units constitute up to 25% by weight, preferably up to 20% by weight and still more preferably up to 15% by weight of the overall molecular weight of the non-ionic surfactant.

Preferably, the one or more nonionic surfactants comprises a mixed alkoxylate fatty alcohol non-ionic surfactant, preferably comprising a greater number of moles of the lower alkoxylate group than of the higher alkoxylate group in the molecule. Preferably the mixed alkoxylate fatty alcohol non-ionic surfactant comprises at least two of EU, PO or BO groups and most preferably only EU and PO groups.

By the term 'higher alkoxylate' it is meant the alkoxylate group having the greatest number of carbon atoms in that alkoxylate group. By the term 'lower alkoxylate' it is meant the alkoxylate group having the lowest number of carbon atoms in that alkoxylate group. Thus, for a mixed alkoxylate fatty alcohol comprising ethoxylate (EU) and propoxylate (PO) groups the EU is the lower alkoxylate and the PO is the higher alkoxylate. Thus, the detergent compositions of the invention comprise mixed alkoxylate fatty alcohols comprising a greater number of EU groups than PO groups. The same applies to other mixed alkoxylates such as those containing EU and butoxylate (BO) or even PO and BO groups.

The mixed alkoxylate fatty alcohol non-ionic surfactant preferably has a mole ratio of the lower alkoxylate group to the higher alkoxylate group is at least 1.1:1, most preferably of at least 1.8:1, especially at least 2:1. It is also preferred that the mixed alkoxylate fatty alcohol non-ionic surfactant comprises between 3 to 5 moles of the higher alkoxylate group and between 6 to 10 moles of the higher lower group, preferably 4 or 5 moles of PO and 7 or 8 moles of EU and most preferably 4 moles of PO and 8 moles of EU.

Preferably the mixed alkoxylate fatty alcohol non-ionic surfactant has 12-18 carbon atoms in the alkyl chain.

It is especially preferred that the mixed alkoxylate fatty alcohol nonionic surfactant comprises at least two of EU, PO or BO groups and especially a mixture of EU and PO groups, preferably EU and PO groups only.

It is most preferred that the mole ratio of the lower alkoxylate group to the higher alkoxylate group is at least 1.1:1, more preferably at least 1.5:1, and most preferably at least 1.8:1, such as at least 2:1 or even at least 3:1.

An especially preferred mixed alkoxylate fatty alcohol nonionic surfactant according to the present invention comprises between 3 to 5 moles of the higher alkoxylate group and between 6 to 10 moles of the lower group. Especially preferred are mixed alkoxylate fatty alcohol nonionic surfactants having 4 or 5 moles of the higher alkoxylate group and 7 or 8 moles of the lower alkoxylate group. According to one aspect of the invention a mixed alkoxylate fatty alcohol nonionic surfactant having 4 or 5 PO moles and 7 or 8 EU moles is especially preferred and good results have been obtained with for surfactants with 4 PO moles and 8 EU moles.

In an especially preferred embodiment, the mixed alkoxylate fatty alcohol nonionic surfactant is C12-15 8EO/4PO.

Surfactants of the above type which are ethoxylated mono-hydroxy alkanols or alkylphenols which additionally comprise poly-oxyethylene-polyoxypropylene block copolymer units may be used. The alcohol or alkylphenol portion of such surfactants constitutes more than 30%, preferably more than 50%, more preferably more than 70% by weight of the overall molecular weight of the non-ionic surfactant.

The mixed alkoxylate fatty alcohol non-ionic surfactants used in the compositions of the invention may be prepared by the reaction of suitable monohydroxy alkanols or alkylphenols with 6 to 20 carbon atoms. Preferably the surfactants have at least 8 moles, particularly preferred at least 10 moles of alkylene oxide per mole of alcohol or alkylphenol.

Particularly preferred liquid mixed alkoxylate fatty alcohol non-ionic surfactants are those from a linear chain fatty alcohol with 12-18 carbon atoms, preferably 12 to 15 carbon atoms and at least 10 moles, particularly preferred at least 12 moles of alkylene oxide per mole of alcohol.

When PO units are used, they preferably constitute up to 25% by weight, preferably up to 20% by weight and still more preferably up to 15% by weight of the over-all molecular weight of the non-ionic surfactant.

The claimed mixed alkoxylate fatty alcohol non-ionic surfactants, and especially the C12-15 fatty alcohol 8EO, 4PO surfactant exhibit: excellent wetting of plastic, glass, ceramic and stainless steel; excellent temperature stability up to 90° C. for processing; good compatibility with thickeners typically used in the detergent compositions (e.g. PEG); and stability in alkaline conditions.

Alternatively, glucamide surfactants prepared from sugars and natural oils, may be used. A preferred example is oleyl glucamide. Also suitable are alkyl polyglycosides (APGs), which are plant-derived from sugars, these surfactants are usually glucose and fatty alcohol derivatives.

The use of a mixture of any of the aforementioned nonionic surfactants is suitable in compositions of the present invention.

The composition may include one or more enzymes. It is preferred that the one or more enzymes are selected from proteases, lipases, amylases, cellulases and peroxidases, with proteases and amylases being most preferred. It is most preferred that protease and/or amylase enzymes are included in the compositions according to the invention as such enzymes are especially effective in dishwashing detergent compositions. More than one species may be used. The total quantity of enzymes is preferably from 1 to 5% by weight, such as from 2 to 4%.

The composition may include one or more bleaching agents, preferably in combination with one or more bleach activators and/or one or more bleach catalysts. The bleaching agent is preferably selected from the group consisting of an oxygen-releasing bleaching agent, a chlorine-releasing bleaching agent and mixtures of two or more thereof. More preferably, the bleaching agent is or comprises an oxygen-releasing bleaching agent.

The bleaching agent may comprise the active bleach species itself or a precursor to that species. Preferably, the bleaching agent is selected from the group consisting of an inorganic peroxide, an organic peracid and mixtures of two or more thereof. The terms "inorganic peroxide" and "organic peracid" encompass salts and derivatives thereof. Inorganic peroxides include percarbonates, perborates, persulphates, hydrogen peroxide and derivatives and salts thereof. The sodium and potassium salts of these inorganic peroxides are suitable, especially the sodium salts. Sodium percarbonate is particularly preferred.

The active bleaching agent is preferably present in an amount of from 5 to 25% by weight, such as from 7 to 23%, from 9 to 19%, or from 11 to 17%.

The composition may further comprise one or more bleach activators and/or bleach catalysts. Any suitable bleach activator may be included, for example TAED, if this is desired for the activation of the bleaching agent. Any suitable bleach catalyst may be used, for example manganese acetate or dinuclear manganese complexes such as those described in EP 1741774 A1, the contents of which are incorporated herein by reference. The organic peracids such as perbenzoic acid and peroxycarboxylic acids e.g. phthalimidoperoxyhexanoic acid (PAP) do not require the use of a bleach activator or catalyst as these bleaches are active at relatively low temperatures such as about 30° C.

The detergent composition may be in any form, such as powder, tablet, gel or contained in a soluble container and composition may be comprises of a plurality of compositions. For example, the composition may be contained in a water-soluble container, preferably a multi-compartment container. The multi-compartment container may comprise a composition in the form of a solid, liquid, gel or paste and at least one further composition in the form of a solid, liquid, gel or paste. Advantageously, the PESA is present in the solid composition.

The inventors have surprisingly found that the use of a composition according to the invention in a tablet form or solid form of a multi-compartment container significantly improves the friability of the tablet or solid.

By the term 'water-soluble' or 'water-dispersible' container as used herein, it is meant a package which at least partially dissolves in water or disperses in water at 20° C. within 10 minutes to allow for egress of the contents of the package into the surrounding water. Preferably, the product is in a unit dose or monodose form. In other words, the product comprises one or more compositions in the quantity required for a single wash cycle of a machine dishwasher. The terms monodose and unit dose may be used interchangeably throughout this disclosure.

In a second aspect of the invention there is provided a method of making a composition described herein.

In a third aspect of the invention there is provided the use of a composition as described herein in an automatic dishwasher. Preferably, the composition is used to inhibit soil redistribution.

Advantageously, there is provided the use of a composition as described herein to inhibit silver corrosion, wherein the composition does not contain one or more acrylic acid-sulphonic acid.

It is to be understood that the compositions and their corresponding quantities described herein are to be combined in any combination, as would be understood by a skilled reader.

The invention is described in the following, non-limiting Examples.

EXAMPLES

Synergistic Effect of Polymer System

Four citrate-based compositions were prepared with only the polymer system* being varied. The compositions were prepared in multi-chambered water-soluble containers.

The components of the base composition are set out in Table 1.

TABLE 1

| Component | Quantity (% by weight) |
|---|---|
| Trisodium citrate | 16% |
| Alkali source | 24% |
| Bleach system | 20% |
| Enzymes | 4% |
| Phosphonate | 6% |
| Non-ionic surfactant | 15% |
| Auxiliaries | 4% |
| PVOH foil | 4% |
| *Polymer system | 7% |

Polymer System:
Comparative Composition 1
  acrylic acid-sulphonic acid copolymer; and
  acrylic acid-maleic acid copolymer
Comparative Composition 2
  acrylic acid-sulphonic acid copolymer only
Composition 3
  PESA; and
  acrylic acid-sulphonic acid copolymer
Composition 4
  PESA;
  acrylic acid-sulphonic acid copolymer; and
  acrylic acid-maleic acid copolymer
IKW Testing
  Standard IKW tests were run with two dishwasher programmes.

Machine: Bosch
  Programme: Eco 50° cycle
  Water hardness: 21° GH

TABLE 2

| Product | Comparative Comp. 1 | Comparative Comp. 2 | Comp. 3 | Comp. 4 |
|---|---|---|---|---|
| Bleachable | 9.7 | 9.7 | 9.8 | 9.9 |
| Tea | 9.4 | 9.4 | 9.5 | 9.7 |
| Tea with Milk | 10.0 | 10.0 | 10.0 | 10.0 |
| Alkaline | 10.0 | 10.0 | 10.0 | 10.0 |
| Milk Skin | 10.0 | 10.0 | 10.0 | 10.0 |
| Protein-containing | 10.0 | 10.0 | 10.0 | 10.0 |
| Crème Brulee | 10.0 | 10.0 | 10.0 | 10.0 |
| Egg Yolk | 10.0 | 10.0 | 10.0 | 10.0 |
| Minced Meat | 10.0 | 10.0 | 10.0 | 10.0 |
| Starch-containing | 9.5 | 9.6 | 9.5 | 9.5 |
| Pasta | 9.1 | 9.1 | 9.1 | 9.0 |
| Starch Mix | 9.9 | 10.0 | 9.9 | 10.0 |
| Total | 9.8 | 9.8 | 9.8 | 9.8 |

Machine: Bosch
  Programme: 1 hour 65° C. cycle
  Water hardness: 21° GH

TABLE 3

| Product | Comparative Comp. 1 | Comparative Comp. 2 | Comp. 3 | Comp. 4 |
|---|---|---|---|---|
| Bleachable | 8.1 | 8.0 | 7.8 | 8.2 |
| Tea | 6.1 | 5.9 | 5.6 | 6.4 |
| Tea with Milk | 10.0 | 10.0 | 9.9 | 10.0 |
| Alkaline | 9.9 | 10.0 | 9.9 | 9.8 |
| Milk Skin | 9.9 | 10.0 | 9.9 | 9.8 |
| Protein-containing | 9.7 | 9.7 | 9.7 | 9.8 |
| Crème Brulee | 10.0 | 10.0 | 10.0 | 10.0 |
| Egg Yolk | 9.7 | 9.7 | 9.7 | 9.8 |
| Minced Meat | 9.5 | 9.3 | 9.5 | 9.5 |
| Starch-containing | 9.5 | 9.5 | 9.5 | 9.5 |
| Pasta | 9.0 | 9.0 | 8.9 | 9.0 |
| Starch Mix | 10.0 | 10.0 | 10.0 | 9.9 |
| Total | 9.3 | 9.2 | 9.2 | 9.3 |

The IKW testing how compositions according to the invention demonstrate a high level of technical performance.

Shine Performance Test with Increased Grease Load

As shown above, compositions performing at the upper end of the standardised tests can be difficult to distinguish from each other. For this reason, the inventors developed a further test with a significantly increased soil load through which to 'stretch' and differentiate the tested compositions.

The IKW soil was altered by reducing the protein level of the soiled dishes and the increasing the fat level in order to get more consumer-relevant test conditions.

The level of both spotting and filming assessed and scored on a range of wares as follows:

5—extremely strong Spotting/Filming
  4—very strong Spotting/Filming
  3—strong Spotting/Filming
  2—slight Spotting/Filming
  1—no Spotting/Filming Machine: Bosch
  Programme: Eco 50° cycle
  Water hardness: 21° GH
  The results are set out in Table 4.

TABLE 4

|  | Comparative comp. 1 | | Comparative comp. 2 | | Comp. 3 | | Comp. 4 | |
| --- | --- | --- | --- | --- | --- | --- | --- | --- |
|  | Spotting | Filming | Spotting | Filming | Spotting | Filming | Spotting | Filming |
| Glasses | 5.0 | 2.0 | 5.0 | 2.0 | 4.4 | 3.0 | 2.1 | 3.0 |
| Cutlery | 3.0 | 3.0 | 5.0 | 2.0 | 5.0 | 2.0 | 2.0 | 2.0 |

The compositions of the invention show an improvement in spotting scores without a decrease in filming performance. This is particularly significant as, practically, if the filming is too heavy, spots are not very visible, and vice versa. An improvement in spotting without a change in film therefore represents a significant improvement in technical performance in term of preventing soil redistribution and thus improving the 'shine' that is relevant to consumers.

It can also be seen that the combination of PESA, acrylic acid-sulphonic acid copolymer and acrylic acid-maleic acid copolymer (Comp. 4) demonstrates a synergistic effect on technical performance particularly improved shine performances, not shown with the individual ingredients.

Silver Corrosion

Tests were carried out contrasting a comparative detergent composition with a composition according to the present invention containing PESA and no sulphonated copolymer, as set out in Table 5.

The results are set out in Table 6.

TABLE 5

| Material | Comparative Composition 5 (% by weight) | Inventive Composition 6 (% by weight) |
| --- | --- | --- |
| Bleach system | 18 | 18 |
| PESA | — | 10 |
| Phosphonate | 9 | 6 |
| AA/AMPS copolymer | 7 | — |
| Trisodium citrate dihydrate | 26 | 28 |
| AA homopolymer | 5 | — |
| Alkali | 17 | 20 |
| Enzymes | 0.7 | 0.7 |
| Surfactant | 5 | 6 |
| Others | 12.3 | 11.3 |

Machine: Miele G 1222 SC GSL
Program: 65° C./65° C.
Scores for Visual Examination by Trained Evaluators:
  5 no surface modifications
  4 minor surface modifications, hardly visible
  3 visible surface modifications
  2 strong surface modifications
  1 very strong surface modifications, clearly visible

TABLE 6

| | 2°GH | |
| --- | --- | --- |
| Water Hardness | Comparative Composition 5 | Inventive Composition 6 |
| 10 cycles | 2.5 | 4.6 |
| 5 cycles | 2.8 | 4.9 |
| 1 cycle | 3.4 | 5.0 |

FIG. 1 demonstrates qualitatively the comparative visual result after 5 wash cycles employing the 'Comparative Composition 5' (left, cutlery items 1-3) and the 'Inventive Composition 6' (right, cutlery items 4-6).

As demonstrated in both Table 6 and FIG. 1, a composition without a sulphonated copolymer results in a significant improvement in the levels of silver corrosion.

Friability

The Comparative and Inventive Compositions, in tablet form, were tested for friability after various time intervals (Table 7).

TABLE 7

| Time | Conditions | Comparative Composition 5 Avg. friability [% abrasion] | Inventive Composition 6 Avg. friability [% abrasion] |
| --- | --- | --- | --- |
| 0 weeks | — | 12 | 0.9 |
| 3 weeks | 25° C./50% r.h. | 20 | 0.7 |
|  | 40° C./75% r.h. | 23 | 0.4 |
| 6 weeks | 25° C./50% r.h. | 20 | 0.7 |
|  | 40° C./75% r.h. | 39 | 0.4 |
| 12 weeks | 25° C./50% r.h. | 31 | 0.7 |
|  | 40° C./75% r.h. | 54 | 0.5 |

Compositions according to the invention demonstrate a surprising reduction in the friability of the tablets.

The invention is defined by the claims.

The invention claimed is:

1. An automatic dishwashing composition, comprising:
   from 0.1 to 20% by weight of polyepoxysuccinic acid (PESA) or derivatives thereof;
   from 1 to 10% by weight of one or more acrylic acid-sulphonic copolymers;
   from 0.1 to 5% by weight of one or more acrylic acid-maleic acid copolymers; and
   citric acid and/or a salt thereof; and
   wherein the composition is contained in a water-soluble multi-compartment container; and
   wherein the composition does not comprise methyl glycine diacetic acid (MGDA).

2. The composition according to claim 1, wherein the derivative of PESA has the general structure:

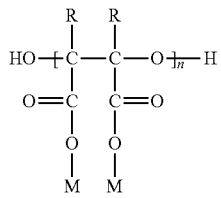

wherein R is a hydrogen or organic chain, n is 2 to 100, and M is a cation.

3. The composition according to claim 1, comprising PESA in an amount of from 0.1 to 15% by weight, based on the total weight of the composition.

4. The composition according to claim 1, further comprising from 3 to 25% by weight of one or more nonionic surfactants, based on the total weight of the composition.

5. The composition according to claim 4, wherein the one or more nonionic surfactants comprises a mixed alkoxylate fatty alcohol non-ionic surfactant.

6. The composition according to claim 5, wherein the mixed alkoxylate fatty alcohol non-ionic surfactant comprises at least two alkoxylate groups comprising a higher alkoxylate group and a lower alkoxylate group, wherein the higher alkoxylate group has a higher number of carbon atoms than the lower alkoxylate group, and wherein the non-ionic surfactant has a greater number of moles of the lower alkoxylate group than of the higher alkoxylate group.

7. The composition according to claim 6, wherein each of the higher and lower alkoxylate groups is selected from the group consisting of an ethoxylate (EO) group, a propoxylate (PO) group, and a butoxylate (BO) group.

8. The composition according to claim 7, wherein the lower alkoxylate group is an EO group, and the higher alkoxylate group is a PO group.

9. The composition according to claim 1, wherein the multi-compartment container comprises a composition in the form of a solid, liquid, gel or paste and at least one further composition in the form of a solid, liquid, gel or paste.

10. The composition according to claim 9, wherein the PESA is present in a solid composition.

11. A method of automatic dishwashing comprising providing the composition as defined in claim 1 to an automatic dishwasher.

12. The method according to claim 11, wherein the automatic dishwasher comprises dishes, and wherein the composition provided to the automatic dishwasher inhibits soil redistribution.

* * * * *